(12) United States Patent
Feldmeier

(10) Patent No.: US 7,226,207 B2
(45) Date of Patent: Jun. 5, 2007

(54) TEMPERATURE GAUGE FOR USE WITH SANITARY CONDUIT

(76) Inventor: Robert H. Feldmeier, 7632 Hunt La., Fayetteville, NY (US) 13066

( * ) Notice: Subject to any disclaimer, the term of this patent is extended or adjusted under 35 U.S.C. 154(b) by 70 days.

(21) Appl. No.: 11/223,664

(22) Filed: Sep. 9, 2005

(65) Prior Publication Data
US 2007/0058690 A1 Mar. 15, 2007

(51) Int. Cl.
*G01K 1/08* (2006.01)
*G01K 1/14* (2006.01)
*G01K 13/00* (2006.01)

(52) U.S. Cl. .................... 374/147; 374/208; 73/866.5
(58) Field of Classification Search ............... 374/148, 374/205, 147, 208, 141; 73/866.5
See application file for complete search history.

(56) References Cited

U.S. PATENT DOCUMENTS

| | | | | |
|---|---|---|---|---|
| 4,104,916 A | * | 8/1978 | Hofer | 374/206 |
| 4,509,550 A | * | 4/1985 | Monk | 137/551 |
| 4,575,262 A | * | 3/1986 | Andersen | 374/147 |
| 4,622,851 A | * | 11/1986 | Wilson | 73/292 |
| 4,637,737 A | * | 1/1987 | Ricchio | 374/141 |
| 4,638,668 A | * | 1/1987 | Leverberg et al. | 73/866.5 |
| 5,079,962 A | * | 1/1992 | Peterson, Jr. | 73/866.5 |
| 5,450,765 A | * | 9/1995 | Stover | 73/866.5 |
| 5,632,556 A | * | 5/1997 | Sivyer | 374/138 |
| 6,367,974 B1 | * | 4/2002 | Lin | 374/179 |
| 6,427,260 B1 | * | 8/2002 | Osborne-Kirby | 4/678 |
| 6,467,819 B2 | * | 10/2002 | Seifert et al. | 285/341 |
| 6,485,175 B1 | * | 11/2002 | Nimberger et al. | 374/142 |
| 6,599,012 B2 | * | 7/2003 | Gul | 374/208 |
| 7,090,658 B2 | * | 8/2006 | Faries et al. | 604/113 |
| 7,188,531 B1 | * | 3/2007 | Feldmeier | 73/744 |
| 2005/0155408 A1 | * | 7/2005 | Weyl et al. | 73/23.31 |
| 2006/0227850 A1 | * | 10/2006 | Johnson | 374/208 |

* cited by examiner

*Primary Examiner*—Gail Verbitsky
(74) *Attorney, Agent, or Firm*—Bernhard P. Molldrem

(57) ABSTRACT

A standard industrial temperature gauge is adapted for a sanitary conduit that has been provided with a tubular stub for mounting the temperature gauge. A disk flange mates with an upper flange of the tubular stub. A aperture or passageway in the disk flange permits the rod probe of the temperature sensor to penetrate through it. An O-ring seal seated within the passageway seals against the rod probe. A female threaded nipple is affixed on the flange disk coaxial with the passageway. This nipple has threads to mate with the male threaded stem of the temperature gauge. A sealing gland or equivalent seal is disposed between the disk flange and the flange of the said tubular stub, so that the sanitary conduit is sealed off when a clamp is installed, removably holding the flange disk in sealed engagement with the tubular stub.

6 Claims, 1 Drawing Sheet

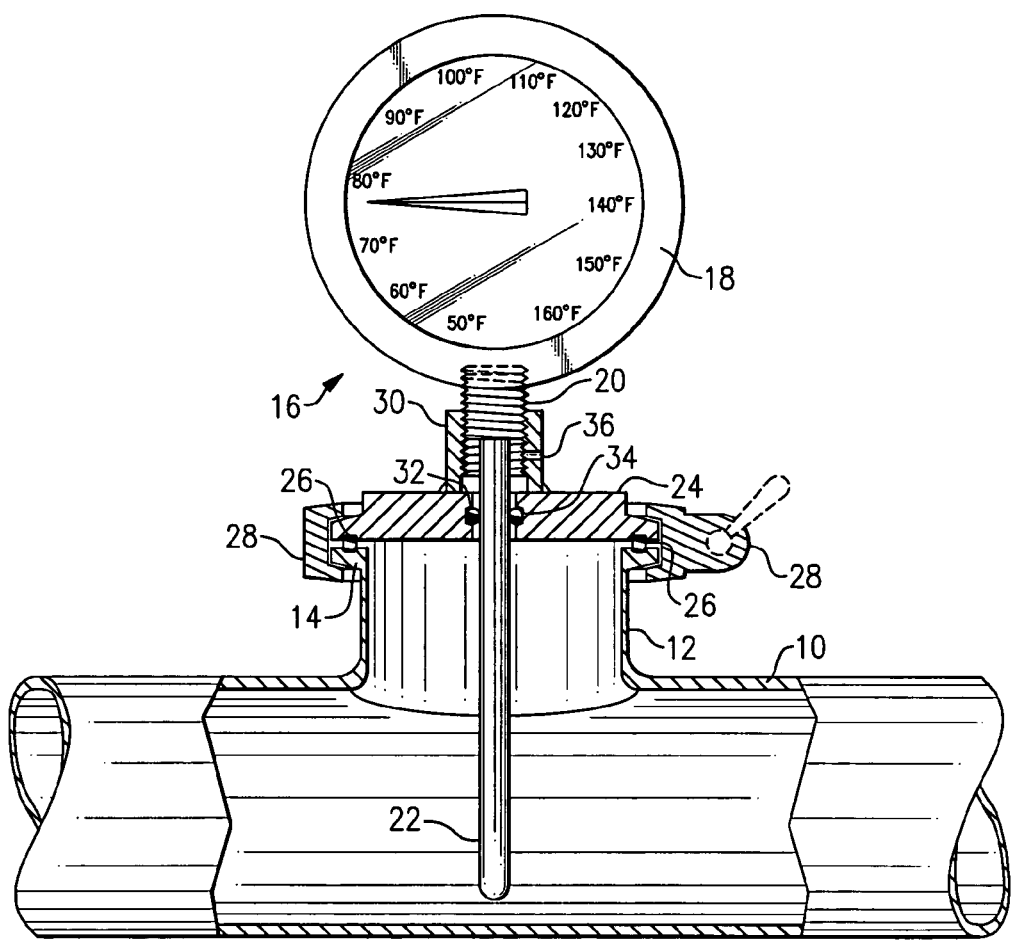

TEMPERATURE GAUGE FOR USE WITH SANITARY CONDUIT

BACKGROUND OF THE INVENTION

This invention relates to the monitoring equipment for processing of liquids used in products for human consumption, e.g., dairy products such as milk, cream, and ice cream mix, other liquid food products, e.g., fruit juices and soups, or pharmaceuticals. The invention is more particularly concerned with an adapter and a technique for employing a standard thermometer or temperature gauge in sanitary conduits in which such liquid products are processed, and which permits the temperature gauge to be changed out or replaced when necessary, without incurring high material or labor costs and while maintaining sanitary conditions within the conduit.

Pasteurization is a process for heat treating milk or other food or ingestible product in order to kill pathogens such as bacteria or other microorganisms. The U.S. Public Health Service has published standards for equipment for the pasteurization of milk and other milk products, and there are similar regulations concerning equipment for processing other products. On the one hand, the temperature of the product has to be closely monitored at certain points in the process. This means that working thermometers or pressure gauges have to be present in the conduit, and must be replaced whenever they fail. On the other hand, in order to ensure that the sanitary conduit can be cleansed and sanitized between processes, the conduit is designed so that it can be completely cleaned of any milk or other product by washing it and rinsing it with a cleaning fluid that must reach every point on the interior of the conduit. No threaded connectors can be used anywhere that the liquid product flows, because of the difficulty in cleaning the threads.

Standard temperature gauges typically have a threaded stem that is used for securing the gauge into a threaded nipple in the associated equipment. A stainless steel temperature probe or finger then projects out of the threaded stem and into the conduit to which the threaded nipple is connected. Because these standard gauges rely on threaded connections to install them and hold them in place, an alternative technique has been employed for using thermometers and temperature gauges in pasteurizers or other sanitary conduits.

One technique that has been employed previously has been to install a flange disk over the stainless steel temperature probe, by welding it onto the finger or probe. Then, the flange disk can be secured to a sealing flange at an outer end of a tubular stub that connects to the conduit. A sanitary clamp, e.g., a so-called tri-clamp, compresses a sealing gland or ring between these two flanges, so there are no threads exposed to the product in the sanitary conduit. Unfortunately, these specially constructed gauges are many times more costly than the standard temperature gauges, and thus much more expensive to replace.

Another alternative is to employ a so-called thermometer well, which is a hollow finger that penetrates into the conduit, and allows the standard gauge to be installed with the finger or probe entering the hollow interior of the thermometer well. This does have the advantage of sanitary operation in that there are no exposed threads. However, the well itself has considerable thermal inertia, and this conceals any rapid temperature swings. That is, the probe itself is not in contact with the liquid, so detection of any temperature change is delayed. In some cases, where a specific temperature or a temperature differential is critical, failure to detect the temperature change can result in inefficient operation, or can produce undesirable changes in product quality, such as scalding.

In a regenerative heat exchanger of the type that is used in many pasteurizers, temperature differences between the raw product side and the pasteurized product side may be only a few degrees. For efficient operation it is important to monitor the temperatures there very closely.

OBJECTS AND SUMMARY OF THE INVENTION

It is an object of the present invention to provide a thermometer or temperature gauge arrangement that can be easily installed for use in conduits for liquid food products, and which avoids the drawbacks of the prior art.

It is another object to provide an adapter that permits installation of a standard type of temperature gauge on a sanitary conduit, while both permitting the temperature probe or finger of the gauge to be in direct contact with the liquid product, and also avoiding any threaded connectors being in contact with the liquid product.

It is a further object to provide an arrangement that is straightforward in construction, and which facilitates installation and change-out of the temperature gauge.

According to one aspect of the invention, a temperature gauge adapter is provided for use in connection with a sanitary conduit through which a liquid product flows whose temperature is to be monitored. The conduit is provided with a tubular stub for mounting the temperature gauge and permitting a cylindrical rod probe of the temperature gauge to contact the fluid in the conduit. As aforementioned, the standard temperature gauge has a body portion, which may contain a dial face, needle, lens, etc. A male threaded stem (typically ¼ inch diameter) protrudes from the body portion, and the rod probe extends from the threaded stem.

In a preferred embodiment, the adapter is formed of a disk flange of a diameter to mate with an upper flange of the tubular stub. A central aperture, i.e., passageway in the disk is of a sufficient diameter to permit the rod probe of the temperature sensor to penetrate through it. There is an O-ring seal seated within the passageway for sealably engaging said rod probe when the latter penetrates the passageway. A female threaded nipple is affixed on the flange disk, for example, by welding, and is coaxial with the passageway. This nipple has its threads adapted to mate with the male threaded stem of the temperature gauge. A sealing gland or equivalent seal means is disposed between the disk flange and the flange of the said tubular stub, so that the sanitary conduit is sealed off when a clamp means is installed, removably holding the flange disk in sealed engagement with the tubular stub.

Preferably, the flange disk has a radially tapered outer edge adapted to receive a standard tri-clamp. The temperature gauge may employ bimetal temperature detection, or may employ any other convenient system, and may provide either a standard needle dial reading or a digital reading, or may provide an electrical output for remote monitoring. In other embodiments, the flange disk need not have a strictly circular profile, so long as it is capable of mating with the upper flange of the associated tubular stub, and so the term "flange disk" should be read broadly.

The processing equipment associated with this invention may be used for whole milk, skim milk, cream, or other dairy products such as flavored milk or ice cream mix. The arrangements of this invention may also be used for processing orange juice, grapefruit juice, apple juice, or other fruit juices. The equipment may be of a tubular heat exchanger design, and may be cleaned-in-place with a minimum of down time. A triple-tube heat exchanger that is suitable for use in various possible processes is described in Feldmeier U.S. Pat. No. 3,386,497, which is incorporated herein by reference.

The above and many other objects, features, and advantages of the arrangements and techniques of the present invention will become apparent from the ensuing detailed description of a preferred embodiment of the invention, when considered in connection with the accompanying Drawing.

BRIEF DESCRIPTION OF THE DRAWING

The sole Drawing FIGURE is a schematic cross section of a sanitary conduit employing a temperature gauge and an adapter according to one embodiment of the invention.

DETAILED DESCRIPTION OF THE PREFERRED EMBODIMENT

The temperature gauge and adapter of the present invention can be employed in connection with a pasteurization process such as that described in my copending U.S. patent application Ser. No. 10/717,875, Nov. 20, 2003, which is incorporated herein by reference.

As shown in the FIGURE, the invention may be employed on a tubular sanitary conduit 10, which may be of the type that processes a dairy product, such as milk or ice cream mix, another edible product such as fruit juice, sauce or soup, or a pharmaceutical product for human or veterinary use. In this case, a tubular stub 12 rises from one side of the conduit 10, and provides a location for installing a gauge. The stub 12 has a ring flange 14 at its upper end. The ring flange 14 has a flat upper surface and a tapered lower surface.

An industrial thermometer or temperature gauge 16 here represents any of a large variety of temperature gauges, of various tuypes and having a variety of temperature ranges, depending on the application. In this example, the gauge 16 has a body portion 18 that is disposed outside the conduit 10. There, the body portion 18 is of a generally cylindrical or disk shape, with a dial, indicator needle, face with temperature gradations, and a cover glass or lens. Alternatively, the gauge could have a digital display or could simply have conductors emerging to lead away toward a temperature display on a control panel or console. As is standard in these gauges, a stem 20 having male threads emerges from the body portion 18, and a stainless steel probe rod or finger 22 extends from the stem 20. Here, a distal end of the probe rod 22 is situated in the main flow of product within the conduit 10.

A flange disk 24 is of a size that mates with the flange ring 14. A seal or sealing gland 26, formed of a compressible seal material, is situated between flat surfaces of the flange disk 24 and the flange ring 14. This may be an O-ring seal, or may be another type of seal gland. The gland is compressed to form a seal when a standard clamp 28 is fitted over the tapered edge surfaces of the disk 24 and ring 14. The clamp 28 is pulled together onto these members in a known fashion. A hand lever (unnumbered) is shown, but other closure systems could be employed to secure the clamp 28.

A female threaded tubular nipple 30 is centrally welded onto the flange disk 24. There is a central bore or passageway 32 formed in the disk 24, and the passageway 32 is coaxial with the nipple 30. The passageway 32 has a diameter that is slightly greater than the diameter of the probe rod 22. An O-ring seal 34 is fitted into a seat in a side wall of the passageway 32, and this O-ring 34 forms a seal between the probe rod 22 and the flange disk 24 when the temperature gauge 16 is installed.

In this arrangement, the probe rod 22 is in intimate thermal content with the contents of the conduit 10, so an accurate reading is reported even in the presence of rapid temperature swings. On the other hand, the temperature gauge 16 is rather inexpensive, i.e., on the order of $10 to $20, as the disk flange 24 does not have to be welded to it, and the gauge 16 can be easily changed out with another standard temperature gauge, when needed.

Additionally, in the event of a failure of the seal 34, leakage of the product or cleaning fluid would be visibly detectable as it emerges between the threads of the stem 20 and nipple 30. When a seal failure occurs, the temperature gauge 16 can be easily removed to permit replacement of the O-ring seal 34 within the passageway 32. In this embodiment, a leak detector hole 36 is provided in the side wall of the nipple 30 to disclose visibly any leakage of liquid past the O-ring 34.

While the invention has been described with reference to a selected embodiment, it should be recognized that the invention is not limited to that precise embodiment. Rather, many modifications and variations will be apparent to persons skilled in the art without departing from the scope and spirit of this invention, as defined in the appended claims.

I claim:

1. Temperature gauge adapter for use in connection with a sanitary conduit through which a liquid product flows whose temperature is to be monitored, the conduit including a tubular stub formed on said conduit to mount a temperature gauge and to permit a cylindrical rod probe of the temperature gauge to contact said fluid, the tubular stub having a flange ring formed at an upper end thereof; and wherein said temperature gauge has a body portion and a male threaded stem from which said rod probe extends; the adapter comprising:

a flange disk of a diameter to mate with the flange ring of said tubular stub;

a seal gland disposed between facing flat surfaces of said flange disk and the flange ring of said tubular stub;

clamp means fitting over said flange disk and said flange ring for removably holding said flange disk in sealed engagement with said flange ring;

a passageway formed in said flange disk of a sufficient diameter to permit the rod probe of the temperature sensor to penetrate therethrough;

an O-ring seal seated within said passageway for sealably engaging said rod probe when the latter penetrates said passageway; and a female threaded nipple affixed on said flange disk and coaxial with said passageway, and having threads to mate with the male threaded stem of said temperature gauge.

2. The temperature gauge adapter of claim 1 wherein said flange disk has a radially tapered outer edge adapted to receive a tri-clamp.

3. The temperature gauge adapter of claim 1 wherein said threaded stem has a diameter of about ¼ inch, and said female threaded nipple has a matching inside diameter.

4. The temperature gauge adapter of claim 1 wherein said passageway and said nipple are centrally disposed on said flange disk.

5. The temperature gauge adapter of claim 1 wherein said probe rod is held in intimate thermal contact with the liquid product flowing in said sanitary conduit, and wherein the threads on said nipple and said threaded stem are kept out of contact with said liquid product.

6. The temperature gauge adapter of claim 1 comprising a leak detector aperture formed in a side wall of said nipple to disclose visibly any leakage of liquid past said O-ring seal.

\* \* \* \* \*